(12) United States Patent  
Schlör

(10) Patent No.: US 11,046,150 B2  
(45) Date of Patent: Jun. 29, 2021

(54) VEHICLE HEATER

(71) Applicant: Eberspächer Climate Control Systems GmbH & Co. KG, Esslingen (DE)

(72) Inventor: Christof Schlör, Lichtenwald (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 163 days.

(21) Appl. No.: 16/105,210

(22) Filed: Aug. 20, 2018

(65) Prior Publication Data

US 2019/0054800 A1 Feb. 21, 2019

(30) Foreign Application Priority Data

Aug. 21, 2017 (DE) ...................... 10 2017 119 077.5

(51) Int. Cl.
*B60H 1/22* (2006.01)
*F23M 5/08* (2006.01)
(Continued)

(52) U.S. Cl.
CPC ......... *B60H 1/2212* (2013.01); *B60H 1/2203* (2013.01); *F23M 5/085* (2013.01); *F24H 1/009* (2013.01); *F24H 3/025* (2013.01); *F24H 3/065* (2013.01); *F24H 3/087* (2013.01); *B60H 2001/2271* (2013.01); *B60H 2001/2278* (2013.01); *F23C 2700/026* (2013.01); *F23N 2241/14* (2020.01); *F24H 3/06* (2013.01)

(58) Field of Classification Search
CPC ................ B60H 1/2212; B60H 1/2203; B60H 2001/2271; B60H 2001/2278; F24H 1/009; F24H 3/006; F24H 3/025; F24H 3/06; F24H 3/065; F24H 3/087; F23M 5/085; F23N 2241/14; F23C 2700/026
USPC .................................................... 237/12.3 C
See application file for complete search history.

(56) References Cited

U.S. PATENT DOCUMENTS 2,362,258 A * 11/1944 Findley ................... F24H 3/065
126/110 E
2,404,676 A * 7/1946 Williams, Jr. ....... B60H 1/2212
126/116 R (Continued)

FOREIGN PATENT DOCUMENTS

DE         3509349 A1 *  9/1986  ......... F28D 21/0008
DE      43 11 080 C1     3/1994
(Continued)

*Primary Examiner* — Daniel E. Namay
(74) *Attorney, Agent, or Firm* — McGlew and Tuttle, P.C.

(57) ABSTRACT

A vehicle heater housing (46) has an inlet area (49), an outlet area (51) and an air flow space (47) for air to be heated with a burner chamber assembly unit (30), to be fed with combustion air and fuel. A heat exchanger area (11), including a heat exchanger housing (12), is elongated in the direction of a housing longitudinal axis (L) with an outer side (24) around which air flowing in the air flow space flows. Heat transfer ribs are on a side of the heat exchanger housing. The heater housing has a housing circumferential wall (56) and an outlet front wall area (58). The heat transfer ribs have a longitudinal edge (64) extending along the housing circumferential wall and a radial edge extending along the outlet front wall area. A distance of the radial edge from the outlet front wall area changes from radially outwards to radially inwards.

20 Claims, 2 Drawing Sheets

(51) Int. Cl.
*F24H 1/00* (2006.01)
*F24H 3/02* (2006.01)
*F24H 3/08* (2006.01)
*F24H 3/06* (2006.01)

(56) References Cited

U.S. PATENT DOCUMENTS

| | | | | |
|---|---|---|---|---|
| 2,757,662 A * | 8/1956 | Baier | B60H 1/2212 | 126/110 R |
| 2,775,293 A * | 12/1956 | Raymond | B60H 1/2212 | 431/262 |
| 2,779,398 A * | 1/1957 | Brown | B60H 1/2212 | 431/231 |
| 3,094,979 A * | 6/1963 | Volbehr | B60H 1/2203 | 126/110 R |
| 3,103,923 A * | 9/1963 | Kofink | B60H 1/2212 | 126/116 R |
| 3,144,862 A * | 8/1964 | Hottenroth | F24H 3/065 | 126/110 R |
| 3,260,298 A * | 7/1966 | Spooner | B60H 1/2212 | 431/28 |
| 3,543,742 A * | 12/1970 | Frankle | B60H 1/2212 | 126/110 B |
| 3,894,526 A * | 7/1975 | Kofink | B60H 1/2212 | 126/110 B |
| 3,989,029 A * | 11/1976 | Friedl | B60H 1/22 | 126/110 B |
| 3,989,030 A * | 11/1976 | Friedl | B60H 1/2212 | 126/110 R |
| 4,216,759 A * | 8/1980 | Friedl | B60H 1/2212 | 126/110 B |
| 4,309,978 A * | 1/1982 | Hensiek | F24H 3/065 | 126/110 B |
| 4,471,754 A * | 9/1984 | Galtz | B60H 1/2212 | 126/110 B |
| 4,513,911 A * | 4/1985 | Sanchez | B60H 1/2212 | 123/142.5 R |
| 4,519,375 A * | 5/1985 | Galtz | B60H 1/2212 | 126/110 B |
| 4,519,772 A * | 5/1985 | Mittmann | F24H 3/065 | 431/45 |
| 4,590,917 A * | 5/1986 | Mossbach | F24H 3/065 | 126/90 R |
| 4,688,718 A * | 8/1987 | Galtz | B60H 1/2212 | 126/110 B |
| 4,852,797 A * | 8/1989 | Goerlich | F23N 1/022 | 237/2 A |
| 4,923,033 A * | 5/1990 | Panick | B60H 1/2212 | 126/116 R |
| 5,056,501 A * | 10/1991 | Ida | B60H 1/2212 | 126/110 B |
| 5,232,153 A * | 8/1993 | Mohring | F24H 9/0068 | 126/110 B |
| 5,249,956 A * | 10/1993 | Chu | B60H 1/00414 | 126/110 B |
| 5,456,408 A * | 10/1995 | Appel | B60H 1/2206 | 237/12.3 C |
| 5,727,730 A * | 3/1998 | Habijanec | B60H 1/2212 | 126/110 A |
| 5,738,506 A * | 4/1998 | Mosig | B60H 1/2203 | 237/12.3 C |
| 5,871,033 A * | 2/1999 | Keinert | F23C 7/008 | 138/43 |
| 6,540,150 B1 * | 4/2003 | Eberspach | F24H 9/2085 | 126/110 B |
| 6,743,012 B2 * | 6/2004 | Wolf | B60H 1/2212 | 165/41 |
| 2002/0117551 A1 * | 8/2002 | Wolf | B60H 1/2212 | 237/12.3 C |
| 2010/0006663 A1 * | 1/2010 | Linscheidt | F23D 11/345 | 237/12.3 C |
| 2010/0115968 A1 * | 5/2010 | Budde | B60H 1/2203 | 62/3.3 |
| 2013/0015255 A1 * | 1/2013 | Collmer | F23C 3/00 | 237/32 |
| 2015/0174988 A1 * | 6/2015 | Collmer | F24H 1/009 | 165/154 |
| 2016/0082811 A1 * | 3/2016 | Haefner | F24H 8/00 | 237/12.3 C |
| 2017/0267064 A1 * | 9/2017 | Brandt | F23N 1/002 | |
| 2019/0054800 A1 * | 2/2019 | Schlor | B60H 1/2212 | |

FOREIGN PATENT DOCUMENTS

| | | | |
|---|---|---|---|
| DE | 93 20 375 U1 | 5/1994 | |
| DE | 197 34 814 C1 | 1/1999 | |
| DE | 10143479 C1 * | 1/2003 | B60H 1/2209 |
| EP | 0131872 A2 * | 1/1985 | B60H 1/2212 |
| EP | 0 287 923 A2 | 10/1998 | |
| JP | 53069336 A * | 6/1978 | B60H 1/2203 |
| JP | 62001618 A * | 1/1987 | B60H 1/2212 |
| JP | 62155469 A * | 7/1987 | |
| JP | 62293087 A * | 12/1987 | |
| JP | 62294847 A * | 12/1987 | |
| JP | 01262214 A * | 10/1989 | F23N 5/102 |
| JP | 07071747 A * | 7/1993 | F23N 5/203 |
| JP | 07071747 A * | 3/1995 | F23D 11/42 |
| JP | 2000238521 A * | 9/2000 | F23M 20/005 |

* cited by examiner

VEHICLE HEATER

CROSS REFERENCE TO RELATED APPLICATIONS

This application claims the benefit of priority under 35 U.S.C. § 119 of German Application 10 2017 119 077.5, filed Aug. 21, 2017, the entire contents of which are incorporated herein by reference.

TECHNICAL FIELD

The present invention pertains to a vehicle heater, which can be used as a parking heater or/and an auxiliary heater in a vehicle to heat condition system areas of the vehicle before start-up or during the operation.

BACKGROUND

A fuel-operated vehicle heater for heating air to be introduced into a vehicle interior is known from DE 197 34 814 C1.

SUMMARY OF THE INVENTION

An object of the present invention is to provide a vehicle heater with improved heat transfer capacity.

According to the present invention, this object is accomplished by a vehicle heater, comprising a heater housing, wherein the heater housing defines an air flow space for air to be heated and has an inlet area for the inlet of air into the air flow space and an outlet area for the outlet of air from the air flow space, a burner chamber assembly unit to be fed with combustion air and fuel in the heater housing, and a heat exchanger area with a heat exchanger housing, which is elongated in the direction of a housing longitudinal axis and around which air flowing in the air flow space can flow on an outer side. Heat transfer ribs are provided on the outer side of the heat exchanger housing. The heater housing has a housing circumferential wall and an outlet front wall area adjacent to the housing circumferential wall. The heat transfer ribs have a longitudinal edge extending along the housing circumferential wall and a radial edge extending along the outlet front wall area. A distance of the radial edge from the outlet front wall area changes, preferably increases, from radially outwards to radially inwards in at least some areas in at least one heat transfer rib.

A nonuniform pressure loss of the air flowing in the air flow space is generated in the axial end area of the heat exchanger area due to the varying, especially diverging configuration of the radial edge in relation to the outlet front wall area. This forces a greater part of this air in contact with the heat exchanger housing and thus a reinforced heat transfer interaction between this air and the heat exchanger housing, especially in an axial end area of the heat exchanger housing, which, adjacent to an approximately cylindrically shaped circumferential wall area, may have a, for example, dome-like-shaped bottom wall area.

In order to configure the above-mentioned effect as efficiently as possible, the distance of the radial edge from the outlet front wall area vary, preferably increase, from radially outwards to radially inwards in at least some areas in all heat transfer ribs.

It is possible to achieve a defined variation of the distance, for example, by the outlet front wall area having a conically tapering configuration in at least some areas, and by the distance of the radial edge from the outlet front wall area varying, preferably increasing, at least in the section of the radial edge extending along the conically tapering area of the outlet front wall area.

For example, the configuration may be such that the conically tapering area of the outlet front wall area is adjacent to the housing circumferential wall in the radially outward direction and is adjacent to a housing outlet section, which provides an outlet opening of the outlet area and is preferably essentially cylindrical, in the radially inward direction, wherein the radial edge extends essentially linearly in the area with varying, preferably increasing, distance to the outlet front wall area.

For a configuration, which is advantageous in terms of the necessary space available for installation, on the one hand, and for the desired nonuniform pressure loss, on the other hand, the radial edge may have an angle in the range of 5° to 15°, preferably about 10°, in relation to the outlet front wall area in the area with varying, preferably increasing, distance to the outlet front wall area.

Further, the vehicle heater according to the present invention may be configured such that in at least one heat transfer rib, preferably in each heat transfer rib, the radial edge has a first radial edge area adjacent to the longitudinal edge in the radially outward direction and a second radial edge area adjacent to the first radial edge area in the radially inward direction and is essentially oriented at right angles to the housing longitudinal axis, and the distance of the radial edge to the outlet front wall area varies, preferably increases, in the first radial edge area, or/and the second radial edge area is located axially opposite the outlet area in the direction of the housing longitudinal axis.

In order to ensure a uniform air flow especially in the area, in which the air to be heated flows through the air flow space essentially in the direction of the housing longitudinal axis along the heat transfer ribs, it is proposed that the housing circumferential wall have an essentially cylindrical configuration at least in its area enclosing the heat exchanger housing, and that the longitudinal edge of at least one heat transfer rib, preferably of all heat transfer ribs, have an essentially constant distance to the housing circumferential wall in the direction of the housing longitudinal axis. For this, it is advantageous when the heat transfer ribs extend essentially linearly in the direction of the housing longitudinal axis.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
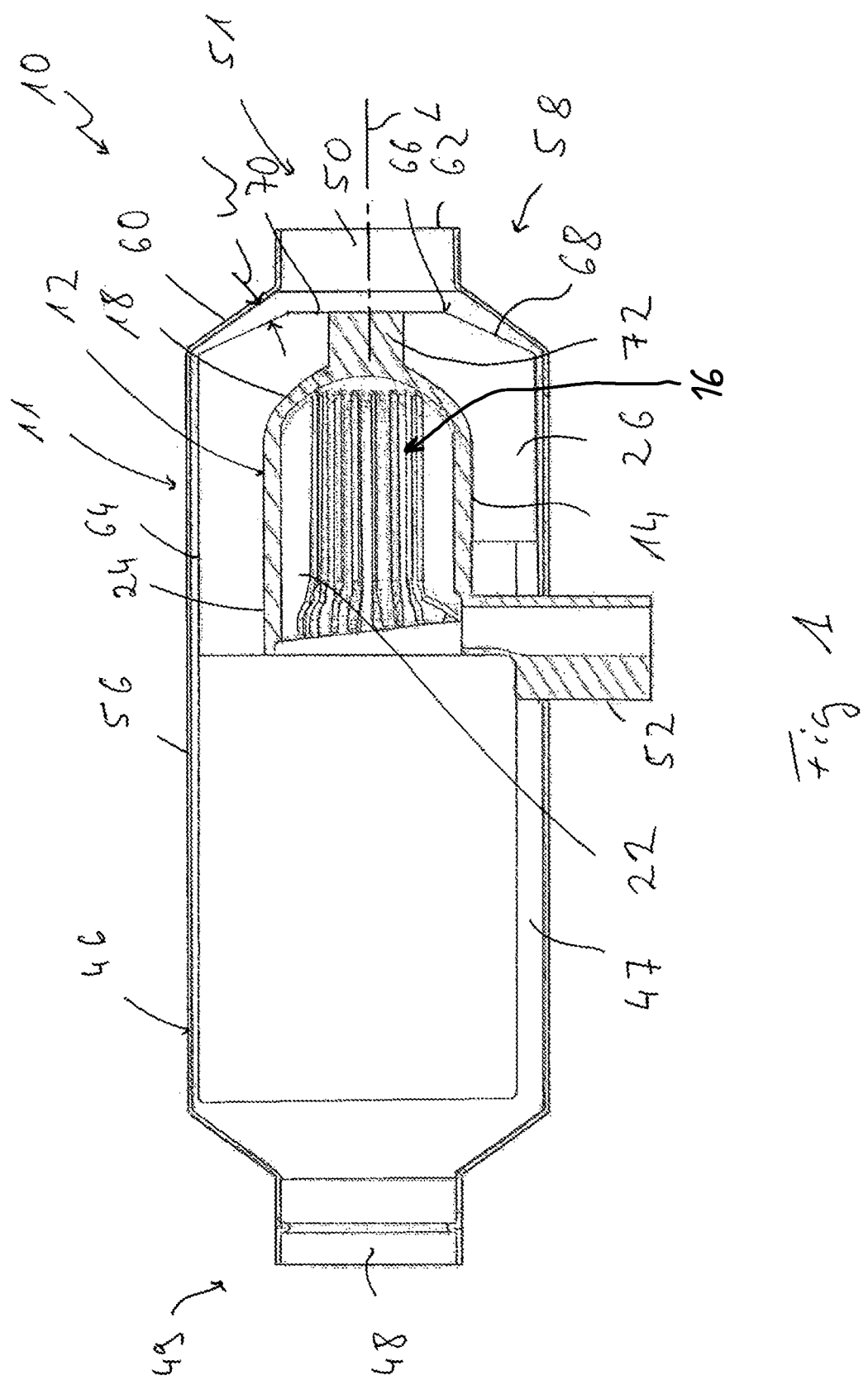
FIG. 1 is a partially simplified and partially longitudinal sectional view of the vehicle heater configured according to the present invention.
Figure 2:
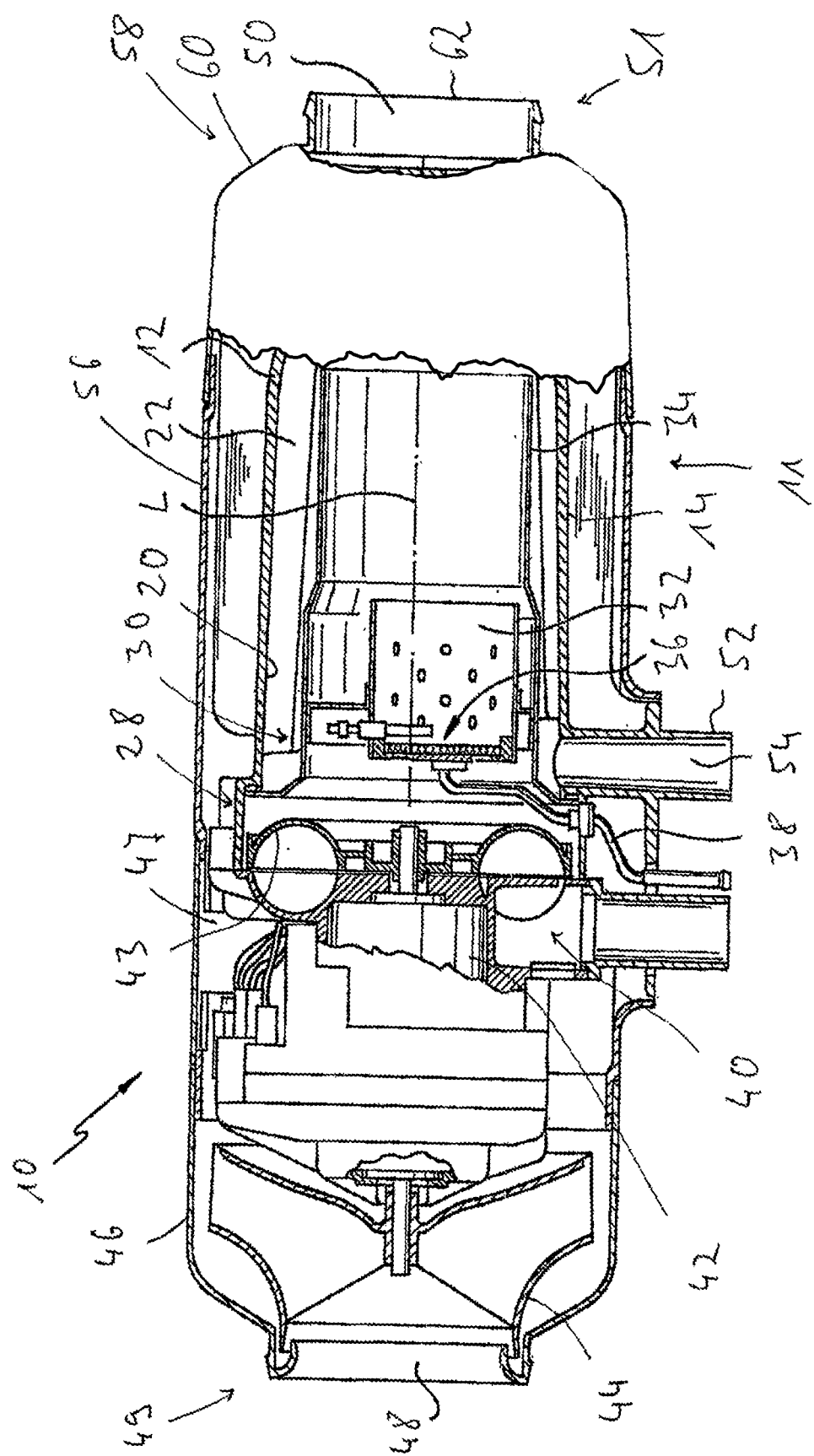
FIG. 2 is a partially cut away longitudinal sectional view of the vehicle heater of FIG. 1.

Referring to the drawings, a fuel-operated vehicle heater 10 has a burner chamber assembly unit and a blower, which is used both to feed the combustion air and to feed the heating air as best shown in FIG. 2. The vehicle heater 10 comprises a heat exchanger area 11 (FIG. 1) with a heat exchanger housing 12 with an elongated circumferential wall area 14 in the direction of a housing longitudinal axis L. A housing interior 16 enclosed by the circumferential wall area 14 is axially closed by a bottom wall area 18 adjacent to the circumferential wall area 14 in the direction of the housing longitudinal axis L. First heat transfer ribs 22 extending up into the bottom wall area 18 are provided on an inner side 20 of the heat exchanger housing 12 facing the housing interior 16. Second heat transfer ribs 26 also extending into the bottom wall area 18 are provided on an outer side 24 of the heat exchanger housing 12 facing away from the housing interior 16.

A burner chamber assembly unit 30 with a burner chamber housing 32 and a Y-pipe 34 is carried on a combustion assembly unit carrier area 28, which is also axially adjacent to the circumferential wall area 14. Liquid fuel is fed via a fuel feed line 38 in a porous evaporator medium 36 provided at a bottom area of the burner chamber housing 32. The air necessary for the combustion is fed by a combustion air blower 40, configured here as a side channel blower, in the direction towards the burner chamber housing 32. The combustion air blower 40 is likewise carried on the combustion assembly unit carrier area 28 of the heat exchanger housing 12. The combustion air blower 40 comprises an electric motor 42, which drives both a feed wheel 43 used to feed the combustion air and a feed wheel 44 used to feed the air to be heated.

A heater housing 46 defines the air flow space 47 through which the air to be heated flows and has a heating air inlet opening 48 in an inlet area 49 close to the feed wheel 44. The air fed by the feed wheel 44 flows along the heater housing 46 in the direction towards the heat exchanger housing 12 and flows around the second heat transfer ribs 26 before it exits from the heater housing 46 at a heating air outlet opening 50 of an outlet area 51 lying near the bottom wall area 18.

The heater housing 46 comprises a housing circumferential wall 56 with, for example, an essentially rectangular cross section and with an essentially cylindrical structure in relation to the housing longitudinal axis L. An outlet front wall area, which is generally designated by 58, is adjacent to the end of the housing circumferential wall 56 located near the outlet area 51. The outlet wall area 58 comprises a conically tapering area 60, which is adjacent to the housing circumferential wall 56 in the radially outward direction in a transition area and is adjacent to a housing outlet section 62 with an essentially cylindrical configuration, for example, with a circular structure in the radially inward direction in a transition area. The heating air outlet opening 50 of the outlet area 51 is formed in this housing outlet section 62.

The combustion air fed by the combustion air blower 40 into the burner chamber housing 32 is burned there with fuel evaporated from the porous evaporator medium 36. The combustion exhaust gases flow along the Y-pipe 34 and reach the interior 16. There, the combustion exhaust gases flow along the first heat transfer ribs 22 back in the direction towards an exhaust gas outlet opening 54 formed in an exhaust gas pipe 52.

The heat transfer ribs 26 provided on the outer side 24 of the heat exchanger housing 12, i.e., the second heat transfer ribs 26, have each in the radially outward direction a longitudinal edge 64 extending essentially in the direction of the housing longitudinal axis L and having an essentially constant distance to the housing circumferential wall 56. In the area located near the outlet area 51, the longitudinal edge 64 passes over into a radial edge 66. In a first radial edge area 68, the radial edge 66 is adjacent to the longitudinal edge 64. A second radial edge area 70, which is oriented essentially at right angles to the housing longitudinal axis L and is located opposite the heating air outlet opening 50 in the axial direction, is adjacent to the first radial edge area 68 in the radially inward direction. The first radial edge area 68 extends essentially parallel to the conically tapering area 60 of the outlet front wall area 58.

FIG. 1 shows a longitudinal section of the heat exchanger housing 12 of the heat exchanger area 11. The first heat transfer ribs 22 formed on the inner side 20 of the circumferential wall area 14 and extending in the direction of the housing longitudinal axis L can be seen. Further, the second heat transfer ribs 26 extending on the outer side 24 of the heat exchanger housing 12 can be seen. These second heat transfer ribs 26 are elongated in the direction of the housing longitudinal axis L and extend in this direction such that the air flowing through the air flow space 47 from the inlet area 49 to the outlet area 51 can flow along the second heat transfer ribs 26 essentially linearly and without lateral deflection. The longitudinal edges 64 of the second heat transfer ribs 26 preferably extend with essentially uniform distance in the direction of the housing longitudinal axis L along the housing circumferential wall 56.

It can be clearly seen in FIG. 1 that the first radial edge area 68 of the radial edges 66 adjacent to the longitudinal edges 64 extends at an angle W in the range of about 10° in relation to the outlet front wall area 58, especially of the conically tapering area 60 of same, so that the distance between the first radial edge area 68 to the conically tapering area 60 of the outlet front wall area 58 increases from radially outwards to radially inwards. The first radial edge area 68 has the minimal distance to the conically tapering area 60 of the outlet front wall area 58 where the first radial edge area 68 is adjacent to the corresponding longitudinal edge area 64, and has the maximum distance to the outlet front wall area 58 and to the conically tapering area 60 of same where the essentially cylindrically shaped housing outlet section 62 is adjacent to the conically tapering area 60 of the outlet front wall area 58. The respective second radial edge area 70 adjacent to the first radial edge area 68 in the radially inner area is located axially opposite the heating air outlet opening 50 radially within the conically extending area 60 of the outlet front wall area 58.

The above-described embodiment is preferably selected in all second heat transfer ribs 26, which have an identical shape and identical dimensions especially in the axial end area of same located near the outlet front wall area 58, so that the first radial edge areas 68 especially also define a common conical surface enclosing same.

A nonuniform pressure loss of the air flowing through the air flow space 47 is generated with this configuration of the axial end area of the heat exchanger housing 12, which leads to this air being forced in a reinforced manner in contact with the heat exchanger housing 12, especially the bottom wall area 18 of same, which is configured essentially with the shape of a spherical dome, in order to absorb heat from the combustion exhaust gases flowing along the inner side 20 in a reinforced manner there. It is thus guaranteed that a greater part of the heat transported into the combustion exhaust gases can be transferred to the air flowing through the heater housing 46.

Finally, it should be pointed out that the embodiment of the heat exchanger housing 12 according to the present invention described in detail above with reference to FIG. 1 may, of course, be varied in many different ways. For example, the transition from the longitudinal edges 64 to the radial edges 66, just as the transition from the corresponding first radial edge area 68 to the corresponding second radial edge area 70, may thus have a rounded configuration in the second heat transfer ribs. Also, in the heater housing 46, which is made, for example, of plastic material, and preferably has a plurality of parts, the transition from the housing circumferential wall 56 to the outlet front wall area 58 may likewise have a rounded configuration, especially in adaptation to the transition formed in the second heat transfer ribs 26. The projection 72, which is adjacent to the bottom wall area 58, deflects the air flow in the axial direction, and is preferably essentially central to the housing longitudinal axis L, which preferably ends axially flush with the corresponding second radial edge areas 70 of the second heat transfer ribs 26, may be configured with different dimensions in the axial direction and in the radial direction. The radial edges 66, especially the first radial edge areas 68 of same, could basically be sloped, even opposite the position shown in FIG. 1, in relation to the outlet front wall area 58, especially of the conical area 60 of same, so that the distance decreases from radially outwards to radially inwards.

The vehicle heater 10 may have a different configuration than shown in FIG. 2 also in the area of the system areas used for combustion and not shown in FIG. 1 as well as the system areas used for the air feed, without deviating from the principles of the present invention.

While specific embodiments of the invention have been shown and described in detail to illustrate the application of the principles of the invention, it will be understood that the invention may be embodied otherwise without departing from such principles.

What is claimed is:

1. A vehicle heater comprising:
    a heater housing comprising a housing circumferential wall defining an air flow space for air to be heated and comprising an inlet area for an inlet of air into the air flow space and an outlet area for an outlet of air from the air flow space, the heater housing having an outlet front wall area adjacent to the housing circumferential wall;
    a burner chamber assembly unit to be fed with combustion air and fuel, the burner chamber assembly unit being disposed in the heater housing; and
    a heat exchanger area comprised of a heat exchanger housing having an elongated configuration in a direction of a housing longitudinal axis and around which air flowing in the air flow space flows on an outer side and heat transfer ribs provided on the outer side of the heat exchanger housing, the heat transfer ribs having a longitudinal edge, extending along the housing circumferential wall, and a radial edge extending along the outlet front wall area, the radial edge of at least one of the heat transfer ribs being located axially opposite the outlet area with respect the direction of the housing longitudinal axis and the radial edge comprising a first radial edge area adjacent to the longitudinal edge of at least one of the transfer ribs with respect to a radially outward direction and a second radial edge area adjacent to the first radial edge area with respect to a radially inward direction, the second radial edge area being angled with respect to the first radial edge area and being oriented at a right angle or nearly at a right angle to the housing longitudinal axis, the housing circumferential wall having a cylindrical configuration at least in an area enclosing the heat exchanger housing and the outlet front wall area having a conically tapering configuration in at least some areas, wherein a distance of the radial edge of the at least one of the heat transfer ribs from the outlet front wall area changes from radially outwards to radially inwards in at least some areas such that the distance increases in the first radial edge area at least in the section extending along the conically tapering area of the outlet front wall area, wherein the longitudinal edge of the at least one of the heat transfer ribs is disposed at a constant distance to the housing circumferential wall in the direction of the housing longitudinal axis.

2. The vehicle heater in accordance with claim 1, wherein the distance of the radial edge from the outlet front wall area increases, from radially outwards to radially inwards in at least some areas of each of the heat transfer ribs.

3. The vehicle heater in accordance with claim 1, wherein the conically tapering area of the outlet front wall area is adjacent to the housing circumferential wall in a radially outward direction and is adjacent to a housing outlet section, providing an outlet opening of the outlet area and essentially cylindrical, in the radially inward direction.

4. The vehicle heater in accordance with claim 1, wherein the radial edge extends essentially linearly in the area with varying distance to the outlet front wall area.

5. The vehicle heater in accordance with claim 1, wherein the radial edge has an angle in the range of 5° to 15°, in relation to the outlet front wall area, in the area with varying distance to the outlet front wall area.

6. The vehicle heater in accordance with claim 1, wherein the heat transfer ribs extend essentially linearly in the direction of the housing longitudinal axis.

7. The vehicle heater in accordance with claim 1, wherein the heat exchanger housing comprises a circumferential wall area extending essentially in a direction of the housing longitudinal axis and a bottom wall area, disposed adjacent to the circumferential wall area and comprising a dome shape.

8. A vehicle heater comprising:
    a heater housing comprising a housing circumferential wall defining an air flow space for air to be heated and comprising an inlet area for an inlet of air into the air flow space and an outlet area for an outlet of air from the air flow space, the heater housing having an outlet front wall area adjacent to the housing circumferential wall;
    a burner chamber assembly unit to be fed with combustion air and fuel, the burner chamber assembly unit being disposed in the heater housing; and
    a heat exchanger area comprised of a heat exchanger housing having an elongated configuration in a direction of a housing longitudinal axis and around which air flowing in the air flow space flows on an outer side and heat transfer ribs provided on the outer side of the heat exchanger housing, each of the heat transfer ribs having a longitudinal edge located radially opposite the housing circumferential wall, wherein the housing circumferential wall is located at a same distance from each and every portion of the longitudinal edge of at least one of the heat transfer ribs, the radial edge of the at least one of the transfer ribs being located axially opposite the outlet area with respect the direction of the housing longitudinal axis and the radial edge comprising a first radial edge area adjacent to the longitudinal edge of at least one of the transfer ribs with respect to a radially outward direction and a second radial edge area adjacent to the first radial edge area with respect to a radially inward direction, the second radial edge area extending in a direction perpendicular to the housing longitudinal axis, the first radial edge area extending in a direction not perpendicular to the housing longitudinal axis, the housing circumferential wall having a cylindrical configuration at least in an area enclosing the heat exchanger housing and the outlet front wall area having a conically tapering configuration in at least some areas, wherein a distance of the radial edge of the at least one of the heat transfer ribs from the outlet front wall area changes from radially outwards to radially inwards in at least some areas such that the distance increases in the first radial edge area at least in the section extending along the conically tapering area of the outlet front wall area.

9. The vehicle heater in accordance with claim 8, wherein the distance of the radial edge from the outlet front wall area increases, from radially outwards to radially inwards in at least some areas of each of the heat transfer ribs.

10. The vehicle heater in accordance with claim 8, wherein the conically tapering area of the outlet front wall area is adjacent to the housing circumferential wall in a radially outward direction and is adjacent to a housing outlet section, providing an outlet opening of the outlet area and essentially cylindrical, in the radially inward direction.

11. The vehicle heater in accordance with claim 8, wherein the radial edge extends essentially linearly in the area with varying distance to the outlet front wall area.

12. The vehicle heater in accordance with claim 8, wherein the radial edge has an angle in the range of 5° to 15°, in relation to the outlet front wall area, in the area with varying distance to the outlet front wall area.

13. The vehicle heater in accordance with claim 8, wherein the heat transfer ribs extend essentially linearly in the direction of the housing longitudinal axis.

14. The vehicle heater in accordance with claim 8, wherein the heat exchanger housing comprises a circumferential wall area extending essentially in a direction of the housing longitudinal axis and a bottom wall area, disposed adjacent to the circumferential wall area and comprising a dome shape.

15. The vehicle heater in accordance with claim 8, wherein the second radial edge area is angled with respect to the first radial edge area.

16. A vehicle heater comprising:
a heater housing comprising a housing circumferential wall defining an air flow space for air to be heated and comprising an inlet area for an inlet of air into the air flow space and an outlet area for an outlet of air from the air flow space, the heater housing having an outlet front wall area adjacent to the housing circumferential wall;
a burner chamber assembly unit to be fed with combustion air and fuel, the burner chamber assembly unit being disposed in the heater housing; and
a heat exchanger area comprised of a heat exchanger housing having an elongated configuration in a direction of a housing longitudinal axis and around which air flowing in the air flow space flows on an outer side and heat transfer ribs provided on the outer side of the heat exchanger housing, each of the heat transfer ribs having a longitudinal edge located radially opposite the housing circumferential wall, wherein the housing circumferential wall and the longitudinal edge of at least one of the heat transfer ribs define an air flow space portion of the air flow space, the air flow space portion having a constant dimension in an axial direction, the axial direction being parallel to the housing longitudinal axis, the radial edge of the at least one of the transfer ribs being located axially opposite the outlet area with respect the direction of the housing longitudinal axis and the radial edge comprising a first radial edge area adjacent to the longitudinal edge of at least one of the transfer ribs with respect to a radially outward direction and a second radial edge area adjacent to the first radial edge area with respect to a radially inward direction, the first radial edge area being oriented in a first direction, the second radial edge area being oriented in a second direction, the second direction being perpendicular or nearly perpendicular to the housing longitudinal axis, the first direction traversing the second direction, the housing circumferential wall having a cylindrical configuration at least in an area enclosing the heat exchanger housing and the outlet front wall area having a conically tapering configuration in at least some areas, wherein a distance of the radial edge of the at least one of the heat transfer ribs from the outlet front wall area changes from radially outwards to radially inwards in at least some areas such that the distance increases in the first radial edge area at least in the section extending along the conically tapering area of the outlet front wall area.

17. The vehicle heater in accordance with claim 16, wherein the distance of the radial edge from the outlet front wall area increases, from radially outwards to radially inwards in at least some areas of each of the heat transfer ribs.

18. The vehicle heater in accordance with claim 17, wherein the conically tapering area of the outlet front wall area is adjacent to the housing circumferential wall in a radially outward direction and is adjacent to a housing outlet section, providing an outlet opening of the outlet area and essentially cylindrical, in the radially inward direction.

19. The vehicle heater in accordance with claim 17, wherein the radial edge extends essentially linearly in the area with varying distance to the outlet front wall area.

20. The vehicle heater in accordance with claim 16, wherein the second radial edge area is angled with respect to the first radial edge area.

* * * * *